United States Patent [19]

Meininger et al.

[11] 4,442,288
[45] Apr. 10, 1984

[54] ANTHRAQUINONE COMPOUNDS

[75] Inventors: Fritz Meininger, Frankfurt am Main, Fed. Rep. of Germany; Joachim W. Otten, deceased, late of Offenbach am Main, Fed. Rep. of Germany; by Ursla Otten, heir, Hiedelberg; by Anna G. Rudolph, heir, Dillenburg, both of Fed. Rep. of Germany

[73] Assignee: Hoechst Aktiengesellschaft, Frankfurt am Main, Fed. Rep. of Germany

[21] Appl. No.: 373,789

[22] Filed: Apr. 30, 1982

[30] Foreign Application Priority Data

May 2, 1981 [DE] Fed. Rep. of Germany ....... 3117482

[51] Int. Cl.³ .......................................... C07D 251/50
[52] U.S. Cl. ................................................. 544/189
[58] Field of Search ...................................... 544/189

[56] References Cited

U.S. PATENT DOCUMENTS

| | | | |
|---|---|---|---|
| 3,223,470 | 12/1965 | Boedeker et al. | 8/39 |
| 3,426,018 | 2/1969 | Eckersley et al. | 544/189 |
| 3,496,174 | 1/1970 | Eckersley et al. | 260/249 |
| 3,975,370 | 8/1976 | Kullman et al. | 544/189 |

FOREIGN PATENT DOCUMENTS

| | | |
|---|---|---|
| 1265698 | 4/1968 | Fed. Rep. of Germany . |
| 1546109 | 11/1968 | France . |
| 2437426 | 4/1980 | France . |
| 2034343 | 6/1980 | United Kingdom . |

OTHER PUBLICATIONS

Chem. Abstr. 84, 123403a (1976).
Chem. Abstr. 96, 36871f (1982).

Primary Examiner—John M. Ford
Attorney, Agent, or Firm—Curtis, Morris & Safford

[57] ABSTRACT

Water-soluble anthraquinone compounds of the formula (1)

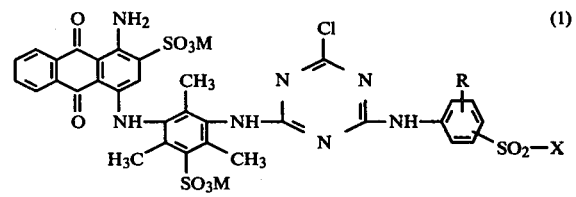

wherein M is a hydrogen atom or the equivalent of a metal, such as in particular sodium or potassium, R is a hydrogen atom, a halogen atom, the methyl, ethyl, methoxy, ethoxy or carboxy group, and X is the vinyl group, a β-thiosulfatoethyl, β-sulfatoethyl or the β-chloroethyl group. These compounds may be prepared in a manner know by itself by reacting an anthraquinone compound of the formula (2)

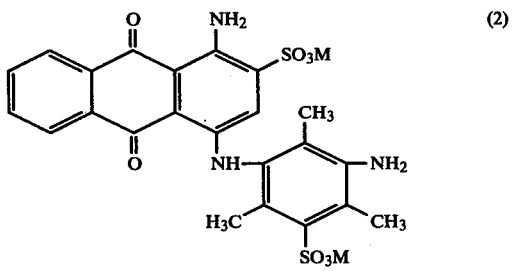

wherein M is defined as above, with an equimolar quantity of cyanuric chloride and an amine of the formula (4)

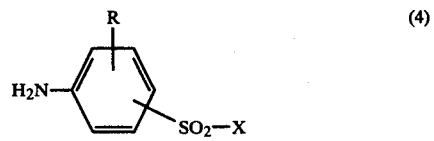

wherein R and X are defined as above, or by reacting said anthraquinone compound of the formula (2) with a compound of the formula (5)

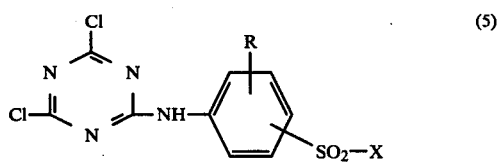

wherein R and X are defined as above. The new compounds of the formula (1) are valuable dyestuffs having fiber-reactive properties. When applied to materials containing hydroxy and/or carbonamide groups, preferably fiber materials, these dyestuffs yield strong and fast dyeings and prints or high tinctorial strength; for example, they are particularly suitable for dyeing (and printing) cellulose fiber materials and wool having an anti-felt or a felt-reducing finish.

2 Claims, No Drawings

ANTHRAQUINONE COMPOUNDS

The present invention relates to the industrial field of fiber-reactive dyestuffs.

New valuable water-soluble anthraquinone compounds of the general formula (1)

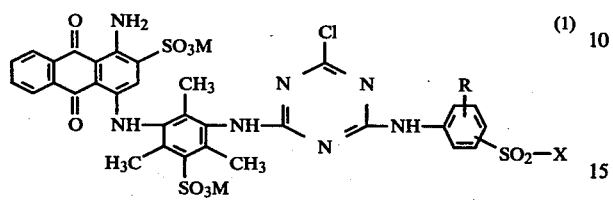

have been found, in which
- M is a hydrogen atom or the equivalent of a metal, such as in particular of an alkali metal or an alkaline earth metal, for example, sodium, potassium, lithium, and of calcium,
- R is a hydrogen atom, the methyl, ethyl, methoxy, ethoxy or carboxy group or a halogen atom, such as a bromine or a chlorine atom,
- $R_1$ is a hydrogen atom or a chlorine atom or the methyl, ethyl or sulfo group,
- $R_2$ is a hydrogen atom or a chlorine atom or the methyl, ethyl, sulfo or cyclohexyl group, and
- X is a β-sulfatoethyl group (corresponding to the formula —CH$_2$—CH$_2$—OSO$_3$M wherein M is defined as above) or a β-thiosulfatoethyl group (corresponding to the formula CH$_2$—CH$_2$—S—SO$_3$M wherein M is defined as above) or the β-chloroethyl group or the vinyl group, and the group of the formula —SO$_2$—X in the benzene nucleus is in the meta- or para-position relative to the acylated amino group.

The new anthraquinone compounds can be in the form of the free acid and in the form of their salts. They are preferably in the form of their salts, in particular the alkali metal salts and the alkaline earth metal salts. They are preferably used in the form of their salts for dyeing (in this context and in the following in the general sense of "coloring", including printing) material, in particular fiber material, containing hydroxy groups and/or carbonamide groups.

The present invention furthermore relates to processes for the manufacture of said anthraquinone compounds of the formula (1) being defined above. These processes comprise reacting a compound of the formula (2)

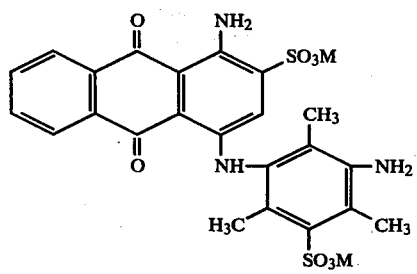

wherein M is defined as above, with trichlorotriazine (cyanuric chloride) in equimolar quantities to yield the dichlorotriazinyl compound of the formula (3)

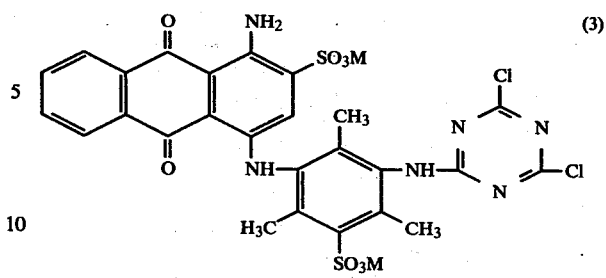

wherein M is defined as above, and condensing the said compound of formula (3) with an aromatic amine of the formula (4)

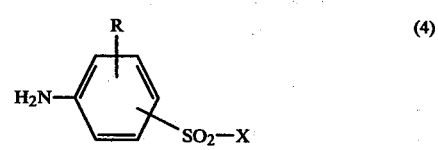

wherein R and X are defined as above, to obtain the compound of the formula (1), or reacting an anthraquinone compound of the formula (2) defined above with a dichlorotriazinyl compound of the formula (5)

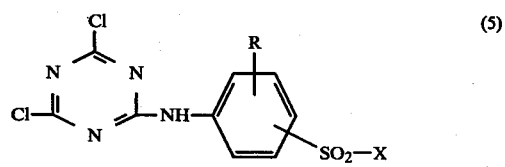

wherein R and X are defined as above.

Condensation of the anthraquinone compound of the formula (2) with cyanuric chloride is carried out in general in aqueous medium or in an aqueous-organic solvent at a temperature of from −5° to +30° C., preferably of from 0 to +10, at a pH of from 3 to 9, preferably of from 5 to 8. The condensation reaction of the dichlorotriazinyl compound of the formula (3) with an aromatic amine of the formula (4) may be carried out at a temperature of from 0° to 70° C., preferably of from 0° to 50° C.

The reaction of the anthraquinone compound of the formula (2) with a dichlorotriazinyl compound of the formula (5) is carried out in general in aqueous medium, optionally while using a organic solvent, at a temperature of from 0° to 60° C., preferably of from 0° to 50° C. at a pH of from 3 to 9, preferably of from 5 to 8.

The hydrochloric acid set free during the condensation reactions is bound by an acid-binding agent such as sodium or potassium hydroxide, sodium or potassium carbonate, sodium or potassium bicarbonate, sodium acetate or a basic sodium phosphate.

The compounds of the formula (1) prepared according to the invention are separated from the synthesis solution by generally known methods, either by precipitation from the reaction medium by means of electrolytes, such as, for example, sodium chloride or potassium chloride, or by evaporation of the reaction solution, for example by spray-drying, it being possible to add a buffer substance to this reaction solution.

The compounds of formula (1) according to the invention have fiber-reactive properties and very good dyestuff properties. They can therefore be used for coloring (in the sense indicated above) materials containing hydroxy groups and/or carbonamide groups. It is also possible for the solutions obtained in the synthesis of the compounds of formula (1), according to the invention, to be put to tinctorial use, directly as a liquid preparation, if appropriate after adding a buffer substance and, if appropriate, after concentrating the solution.

The present invention thus also relates to the use of the compounds of formula (1) according to the invention for coloring a material containing hydroxy groups and/or carbonamide groups, respectively, to processes for their application to these substrates. The materials are preferably used in the form of fiber materials, in particular in the form of textile fibers, such as yarns, wound packages and fabrics.

Materials containing hydroxy groups are natural or synthetic materials such as, for example, cellulose fiber materials or regenerated products thereof and polyvinyl alcohols. Cellulose fiber materials are preferably cotton, but also other vegetable fibers, such as linen, hemp, jute and ramie fibers; regenerated cellulose fibers are, for example, rayon staple and viscose rayon.

Materials containing carbonamide groups are, for example, synthetic and natural polyamides and polyurethanes, in particular in the form of fibers, for example wool and other animal hair, silk, leather, polyamide-6, polyamide-66, polyamide-11 and polyamide-4.

The compounds of formula (1) according to the invention can be applied to and fixed on the substrates mentioned, in particular the fiber materials mentioned, by the application techniques known for water-soluble dyestuffs, in particular for water-soluble fiber-reactive dyestuffs.

Thus, using the compound of formula (1), very good color yields and an excellent color build up are obtained on cellulose fibers in the exhaustion process from a long-liquor bath in the presence of the most various acid-binding agents and, if appropriate, of neutral salts, such as sodium chloride or sodium sulfate. Dyeing is carried out preferably in aqueous bath at a temperature of 60° to 105° C., optionally at a temperature up to 120° C. under pressure and optionally in the presence of customary dyeing auxiliaries. The procedure may be as follows: The material is introduced into the warm bath, which latter is heated gradually to the desired dyeing temperature and the dyeing process is carried to completion at this temperature. The neutral salts accelerating an exhaustion of the dyestuff may be added optionally to the bath only after the real dyeing temperature has been reached.

In a padding process, there are likewise obtained excellent color yields and a very good color build up on cellulose fibers with the use of the compounds of formula (1). Fixation of the compound of formula (1) on the material may take place, in usual manner, by keeping the padded material at room temperature or at elevated temperature, for example at a temperature up to about 60° C., or by steaming or by means of dry heat.

In customary printing processes for cellulose fibers materials—such as in a single-phase procedure which may, for example, be performed by printing a printing paste containing sodium bicarbonate or an other acid-binding agent, and following fixation by steaming at a temperature of 100° to 103° C., or in a two-phase procedure which may, for example, be performed by printing with a neutral or slightly acidic printing paste and following fixation either by passing the printed material through a hot, electrolyte-containing alkaline bath or by overpadding it with an alkaline electrolyte-containing padding liquor and then leaving the material to stand or steaming it or treating it with dry heat—there are obtained prints of high tinctorial strength having pronounced outlines and a clear white ground. The quality of the prints depends only little on the varying fixation conditions.

Hot air of 120° to 200° C. is employed in the fixation process by means of dry heat by the customary thermofixation processes. Instead of the usual steam of 101° to 103° C. there may be used overheated steam and pressure steam of a temperature up to 160° C.

Examples of suitable acid-binding agents that provoke a fixation of the compound of the formula (1) on the cellulose fibers are water-soluble basic salts of alkali metals, and likewise of alkaline earth metals, of inorganic or organic acids, or compounds forming an alkali at elevated temperature. Particularly appropriate are alkali metal hydroxides and alkali metal salts of slightly (weakly) acidic inorganic or organic acids or of inorganic or organic acids of medium strength, the sodium and potassium compounds thereof being preferred. Examples of acid-binding agents of the above type are sodium hydroxide, potassium hydroxide, sodium carbonate, sodium bicabonate, potassium carbonate, sodium formate, sodium dihydrogenophosphate, disodium hydrogenophosphate, sodium trichloroacetate, sodium silicates (water-glass) or trisodium phosphate.

By treating the compounds (dyestuffs) of formula (1) with the acid-binding agent, optionally under the action of heat, they are bound chemically to the cellulose fiber. They are distinguished on these fiber materials by a high fixation yield in the dyeing as well as in the printing processes. After having been aftertreated in usual manner by rinsing in order to remove dyestuff portions that have not been fixed, the dyeings and prints on cellulose fibers exhibit an excellent fastness to wetting, since dyestuff portions that have not been fixed may be readily removed by washing because of their good solubility in cold water. Dyeings on polyurethane and polyamide fibers are carried out usually in an acid medium. The procedure may be as follows: Acetic acid and/or ammonium sulfate or acetic acid and ammonium acetate or sodium acetate may be added to the dyebath in order to obtain the desired pH. To obtain a satisfactory levelness of the dyeing, an addition of a customary levelling auxiliary is recommended. These auxiliaries may be compounds based on a reaction product of cyanuric chloride and the 3-fold molar quantity of an aminobenzenesulfonic acid and/or an aminonaphthalenesulfonic acid or based on a reaction product of stearylamine and ethylene oxide, by way of example.

Generally, the material to be dyed is introduced into the bath at a temperature of about 40° C., it is moved for some time, whereupon the dyebath is adjusted to the desired weakly acidic pH, preferably a weakly acetic acidic pH, and the actual dyeing procedure is carried out at a temperature of 60° to 98° C. Dyeing may be carried out alternatively at boiling temperature or at a temperature up to 120° C. (under pressure).

The dyeings and prints prepared with the compounds of formula (1) are distinguished by very clear shades. In particular the dyeings and prints on cellulose fiber materials have very good fastness properties to wetting, such as good fastness to washing, milling, water, sea-water, cross-dyeing and perspiration, as well as good fastness properties to pleating, ironing and rubbing.

The use, according to the invention, of compounds of formula (1) for the fiber-reactive dyeing of wool is of special importance. In particular, wool with anti-felt or felt-reducing finish (see, for example, H. Rath, Lehrbuch der Textilchemie, Springer-Verlag, 3rd edition (1972), pages 295–299, especially finishing according to the so-called Hercosett process (page 298); J.Soc.Dyers and Colourists 1972, 93–99, and 1975, 33–44) can also be dyed with very good fastness properties.

The process of dyeing wool is carried out in usual and known manner, such as in an exhaustion process by preferably conducting the process first in acid aqueous dyeing bath at a controlled pH of from about 3.5 to 5.5 and, towards the end of the dyeing procedure, at an increased pH which is shifted to the neutral and optionally weakly alkaline range up to 8.5 in order to achieve the complete fiber-reactive bonding between the dyestuff of formula (1) and the fiber, what is especially required if a high color-depth is desired. Simultaneously that dyestuff portion which is not bound chemically to the fiber, is separated.

This method is also valid for the manufacture of dyeings on fiber materials from other natural polyamides or from synthetic polyamides and polyurethanes. The dyeings are conducted at a temperature of 60° C. to 100° C., but they can also be carried out in closed dyeing machines at a temperature up to 106° C. Since the water-solubility of the compounds of formula (1) is very good, they can also advantageously be used in customary continuous dyeing processes. The compounds of formula (1) have a very good tinctorial strength. On fiber materials, especially in reactive dyeing of wool, they provide very clear, reddish blue dyeings. When applying dyeing temperatures of 100° C. to 106° C., high exhaustion of the bath is observed.

The dyeings obtained with the compounds of formula (1) according to the invention do not require an aftertreatment in an aqueous bath containing ammonia, which is, in general, usual for dyeings obtained with other, known fiber-reactive dyestuffs. In comparison with known dyestuffs with similar constitution, they surprisingly have a very good color build-up with the brilliancy being maintained even in deep shades. Moreover, they can easily be combined with other fiber-reactive wool dyes, which facilitate a surprisingly level dyeing of the fiber. Material from wool fibers of different origin can also be dyed level with compounds according to the invention. For improving the leveling behaviour a customary leveling agent, for example N-methyltaurine, may be added.

When using customary fiber-reactive dyeing auxiliaries, the compounds according to the invention provide level dyeings even on wool with anti-felt or felt-reducing finish. Dyeings having a light to medium color-depth possess, without an aftertreatment with ammonia, very good fastnesses to wetting although said aftertreatment may be preferred. Besides their very good fastness to light, these wool dyeings have very good wet fastness properties, especially an excellent fastness to alkaline perspiration and very good fastness to washing at 60° C., even in the case of dyeings with high color-depths.

In particular the compounds of the formula (6)

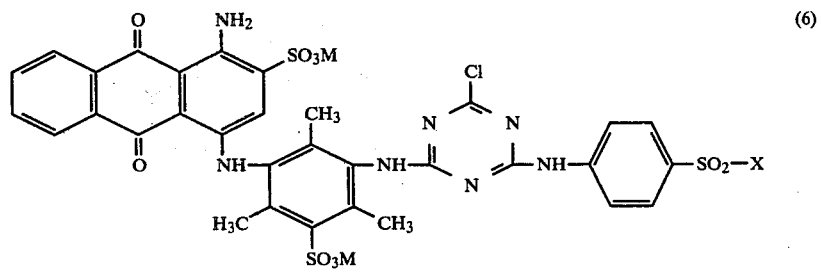

should be stressed amongst the compounds according to the invention. In said formula X is the vinyl group, a $\beta$-thiosulfatoethyl or a $\beta$-sulfatoethyl group and M ist defined as above and is preferably sodium or potassium.

The following Examples illustrate the invention. Unless stated otherwise, parts and percentages are by weight. Parts by weight are to parts by volume as kilogram to liter.

EXAMPLE 1

A solution of pH 7.5–8.0 consisting of 53.1 parts of 1-amino-4-(3'-amino-2',4',6'-trimethyl-5'-sulfophenylamino)-anthraquinone-2-sulfonic acid in about 420 parts of water is added dropwise to a suspension of 19 parts of cyanuric chloride in 150 parts of icewater. The temperature of the reaction mixture is maintained at 0° to 5° C. by cooling and the pH is maintained simultaneously at 6 to 7 by adding dropwise a sodium carbonate solution. Stirring is continued at said temperature and at said pH for a further 2 hours, until condensation is complete. To the batch obtained there is added the neutral solution of 32 parts of 4-$\beta$-thiosulfatoethylsulfonyl aniline in about 150 parts of water. The reaction mixture is heated to 60° C. and stirred at this temperature for 2 hours, the pH being maintained at 6.5–7.0 by adding dropwise an aqueous sodium carbonate solution. Next, 5 parts of disodium phosphate re added and the synthesized compound is isolated by spray-drying. There are obtained about 142 parts of a black-blue, electrolyte-containing powder which contains the sodium salt of the compound of the formula

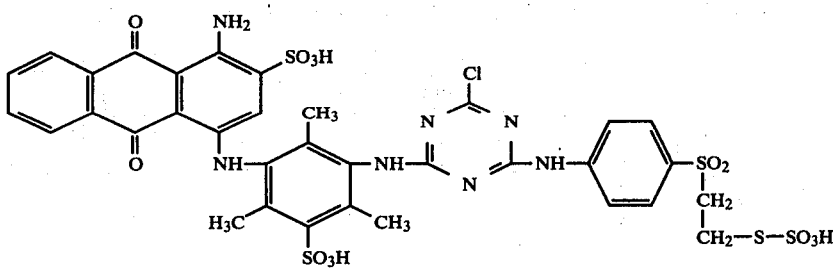

This anthraquinone compound has excellent dyestuff properties. It may be applied to and fixed on the fiber material specified in the discription part by the application and fixation methods customarily used in industry for fiber-reactive dyestuffs. Due to its fiber-reactive properties there are obtained clear blue dyeings and prints having a reddish shade and very good fastness properties to light and to washing, for example on cotton.

EXAMPLE 2

The procedure is as in Example 1, using, however, in the second condensation step, instead of 4-β-thiosulfato-ethylsulfonyl aniline 30 parts of 4-β-sulfatoethylsulfonyl aniline. Upon completion of the reaction the reaction solution is cooled to room temperature and the synthesized compound is precipitated by 80 parts of potassium chloride, suction-filtered, washed with a 20% aqueous potassium chloride solution, dried unter reduced pressure at 60° C. and ground. There are obtained about 151 parts of a black-blue, electrolyte-containing powder which contains the sodium/potassium salt of the compound of the formula

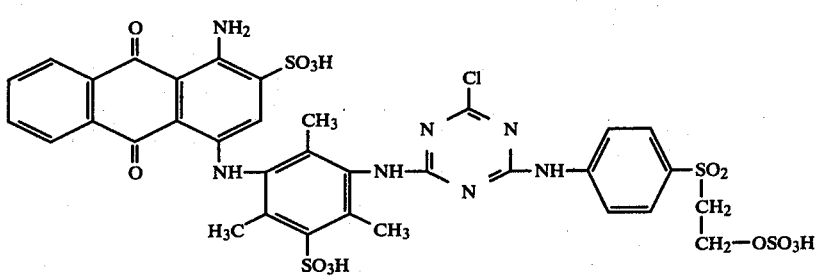

This anthraquinone compound has excellent dyestuff properties. For example, when applied to cotton and wool from an aqueous-alkaline or from a weakly alkaline bath by the usual exhaustion and padding processes or when printed, this dyestuff gives clear blue dyeings or prints having very good fastness properties to wetting.

EXAMPLE 3

The procedure is as in Example 1, using, however, in the second condensation step, instead of 4-β-thiosulfato-ethylsulfonyl aniline 19 parts of 4-vinylsulfonyl aniline. Working up, which is carried out analogously as in Example 1, gives 131 parts of a dyestuff powder which contains the sodium salt of the compound of the formula

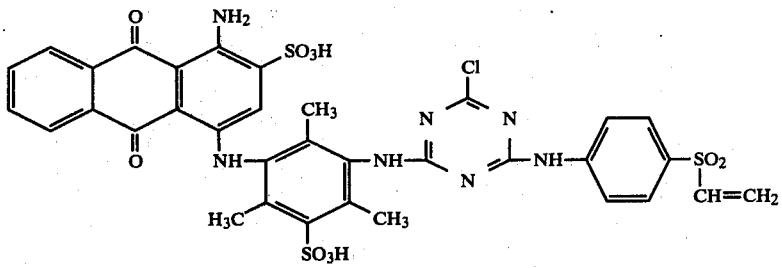

When applied to wool and cotton by the dyeing and printing processes customarily employed for reactive dyestuffs, this dyestuff yields clear reddish-blue shades having very good fastness properties to wetting.

EXAMPLE 4 TO 9

The procedure is analogous to one of the methods described in the above execution examples, using, however, in the second condensation step, the equivalent quantity of the aniline compound of the formula (4) as specified below. The compounds thus obtained likewise dye wool or cotton in clear reddish-blue shades having very good fastness properties.

| Example | Starting compound (2) |
|---|---|
| 4 | 3-β-sulfatoethylsulfonyl aniline |
| 5 | 3-vinylsulfonyl aniline |
| 6 | 4-methoxyaniline-3-β-sulfatoethylsulfone |
| 7 | 2-methoxyaniline-5-β-sulfatoethylsulfone |
| 8 | 2-chloroaniline-5-β-sulfatoethylsulfone |

| Example | Starting compound (2) |
|---|---|
| 9 | 2-methylaniline-4-vinylsulfone. |

APPLICATION EXAMPLE 1

15 Parts of the compound according to the invention of Example 1 are dissolved in 200 parts of hot water togehter with 50 parts of urea. 400 Parts of a thickener composition of 40 parts of a sodium alginate in 960 parts of water as well as 20 parts of sodium bicarbonate are added under stirring. The batch is then completed to 1,000 parts by adding water and thickener. The resulting printing paste is used for printing a cotton fabric which is dried, steamed for 5 minutes at 101° to 103° C., rinsed successively with cold and with hot water, saponified at the boil, rinsed again and dried. There is obtained a reddish-blue print having very good fastness properties to wetting.

APPLICATION EXAMPLE 2

100 Parts of a wool top are prewashed in usual manner and, at 40° C., introduced into 3,000 parts of an aqueous dyebath containing 1 part of an auxiliary obtained by oxethylation of a $C_{12}$–$C_{14}$ fatty amine with 5 mols of ethylene oxide, as well as 2 parts of ammonium acetate. The pH is adjusted at 4.8 to 5 by acetic acid. The substrate is treated in said bath for 5 minutes. Thereafter, 1.5 parts of the compound according to the invention of Example 3, dissolved in a small quantity of water, is added. The bath is heated to boiling temperature within 30 minutes and the top is dyed at this temperature for 60 minutes. The resulting dyeing is rinsed in water, slightly acidified, rinsed again and dried. The wool top dyed shows a clear intense reddish-blue shade having very good fastness properties to light and to wetting and a perfect levelness.

What is claimed is:

1. A compound of the formula (1)

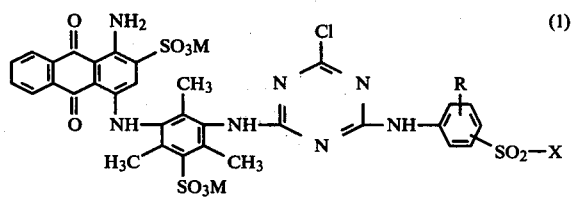

wherein
M is hydrogen or the equivalent of a metal,
R is hydrogen, halogen, methyl, ethyl, methoxy, ethoxy or carboxy, and
X is vinyl, β-sulfatoethyl, β-thiosulfatoethyl or β-chloroethyl, and
the group of the formula —$SO_2$—X is bound to the benzene nucleus in the para position with respect to the amino group.

2. A compound according to claim 1 of the formula (1) wherein R is hydrogen, X is vinyl, β-thiosulfatoethyl or β-sulfatoethyl and M is defined as in claim 1.

* * * * *